United States Patent
Gattiker et al.

(10) Patent No.: US 9,251,136 B2
(45) Date of Patent: *Feb. 2, 2016

(54) DOCUMENT TAGGING AND RETRIEVAL USING ENTITY SPECIFIERS

(71) Applicant: INTERNATIONAL BUSINESS MACHINES CORPORATION, Armonk, NY (US)

(72) Inventors: Anne Elizabeth Gattiker, Austin, TX (US); Fadi H. Gebara, Austin, TX (US); Anthony N. Hylick, Austin, TX (US); Rouwaida N. Kanj, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/055,379

(22) Filed: Oct. 16, 2013

(65) Prior Publication Data

US 2015/0106376 A1 Apr. 16, 2015

(51) Int. Cl.
*G06F 17/30* (2006.01)
*G06F 17/27* (2006.01)

(52) U.S. Cl.
CPC ........ *G06F 17/2705* (2013.01); *G06F 17/2735* (2013.01); *G06F 17/3066* (2013.01); *G06F 17/30675* (2013.01); *G06F 17/30707* (2013.01)

(58) Field of Classification Search
CPC ................ G06F 17/30616; G06F 17/30011
See application file for complete search history.

(56) References Cited

U.S. PATENT DOCUMENTS

| 6,038,561 | A  | * | 3/2000  | Snyder et al.   |
|-----------|----|---|---------|-----------------|
| 6,098,066 | A  | * | 8/2000  | Snow et al.     |
| 6,473,730 | B1 |   | 10/2002 | McKeown et al.  |
| 7,069,505 | B2 |   | 6/2006  | Tamano          |
| 7,185,001 | B1 |   | 2/2007  | Burdick et al.  |

(Continued)

FOREIGN PATENT DOCUMENTS

| KR | 2010106718 A    | 10/2010 |
|----|-----------------|---------|
| WO | WO 2007008263   | 1/2007  |
| WO | WO 2012040673   | 3/2012  |

OTHER PUBLICATIONS

U.S. Appl. No. 13/891,610, filed May 10, 2013, Gattiker, et al.

(Continued)

*Primary Examiner* — Shiow-Jy Fan
(74) *Attorney, Agent, or Firm* — Mitch Harris, Atty at Law, LLC; Andrew M. Harris; William J. Stock

(57) ABSTRACT

Techniques for managing big data include tagging of documents and subsequent retrieval using per-subject dictionaries having entries with some entries specially designated as entities. An entity indicates that the term in the entry has special meaning, e.g., brands (trademarks/service marks), trade names, geographic identifiers or other classes of terms. A dictionary may include a non-entity entry for a term and one or more entity entries, for different entity types. The entries may also include subject-determining-power scores. The subject-determining-power scores provide an indication of the descriptive power of the term with respect to the subject of the dictionary containing the term. The same term may have entries in multiple dictionaries with different subject-determining-power scores in each of the dictionaries. The entity distinctions for a term can then be used in tagging documents and processing retrieval requests.

18 Claims, 6 Drawing Sheets

| 24A      | BICYCLES |            |
|----------|----------|------------|
| RALEIGH  | 9        | Brand      |
| RALEIGH  | 4        | Place      |
| SCHWINN  | 7        | Non-entity |
| FRAME    | 2        | Non-entity |

| 24B       | AMERICAN HISTORY |            |
|-----------|------------------|------------|
| RALEIGH   | 8                | Person     |
| RALEIGH   | 6                | Place      |
| RALEIGH   | 1                | Brand      |
| JEFFERSON | 9                | Non-entity |

| 28A DOCUMENT TITLE/ SUMMARY |
|---|
| LINK TO DOCUMENT |
| Subject 1, term 1, ecode 1; term 2, ecode 2; ... |
| Subject 2, term 1, ecode 1; term 2, ecode 2; ... |

| 28B DOCUMENT TITLE/ SUMMARY |
|---|
| LINK TO DOCUMENT |
| Subject1 |
| Subject2 |

(56) References Cited

U.S. PATENT DOCUMENTS

| | | | |
|---|---|---|---|
| 7,676,462 | B2 | 3/2010 | Kirkland et al. |
| 8,019,748 | B1 | 9/2011 | Wu et al. |
| 8,180,783 | B1 | 5/2012 | Fletcher et al. |
| 2002/0022956 | A1 | 2/2002 | Ukrainczyk et al. |
| 2003/0158839 | A1 | 8/2003 | Faybishenko et al. |
| 2004/0024739 | A1* | 2/2004 | Copperman et al. .............. 707/1 |
| 2005/0289168 | A1 | 12/2005 | Green et al. |
| 2006/0101102 | A1 | 5/2006 | Su et al. |
| 2006/0235843 | A1 | 10/2006 | Musgrove et al. |
| 2008/0082486 | A1 | 4/2008 | Lermant et al. |
| 2009/0006391 | A1 | 1/2009 | Ram |
| 2009/0094020 | A1 | 4/2009 | Marvit et al. |
| 2009/0198669 | A1 | 8/2009 | Shaw et al. |
| 2009/0292686 | A1 | 11/2009 | Carter et al. |
| 2010/0131507 | A1 | 5/2010 | Pradhan et al. |
| 2010/0169375 | A1* | 7/2010 | Cumby et al. ................ 707/780 |
| 2010/0198816 | A1* | 8/2010 | Kwan ........................... 707/723 |
| 2010/0293174 | A1 | 11/2010 | Bennett et al. |
| 2011/0125791 | A1 | 5/2011 | Konig et al. |
| 2011/0184932 | A1 | 7/2011 | Hennum et al. |
| 2011/0208776 | A1 | 8/2011 | Lee et al. |
| 2011/0320186 | A1 | 12/2011 | Butters et al. |
| 2011/0320437 | A1* | 12/2011 | Kim et al. ..................... 707/722 |
| 2012/0078902 | A1 | 3/2012 | Duboue et al. |
| 2012/0158703 | A1 | 6/2012 | Li et al. |
| 2013/0173604 | A1* | 7/2013 | Li et al. ......................... 707/723 |
| 2015/0134666 | A1 | 5/2015 | Gattiker et al. |

OTHER PUBLICATIONS

Godoy, et al., "Modeling User Interests by Conceptual Clustering," ISISTAN Research Institute, UNICEN University Campus Universitario, Tandil (7000), Jan. 18, 2005, pp. 247-265, Buenos Aires, Argentina.

Software Patent Institute, "A Framework for Basic Research on Mechanized Information Storage, Search and Selection," IP.com No. IPCOM000128819D, Sep. 19, 2005, 19 pages (pp. 1-19 in pdf).

IBM, "System and Method to Refine Search Terms for Repetitive Search Queries Based on Explicit User Feedback," IP.com No. IPCOM000160889D, Dec. 3, 2007, 3 pages (pp. 1-3 in pdf).

Anonymous, "Parse Search Terms in Content Discovery," IP.com No. IPCOM000203097D, Jan. 19, 2011, 4 pages (pp. 1-4 in pdf).

IBM, "Enhancing the Classification, Organization, and Mining of Unstructured Data Using Second and Higher Order Meta-Tags," IP.com No. IPCOM000143547D, Nov. 28, 2006, 4 pages (pp. 1-4 in pdf).

Anonymous, "Complex Data Tags," IP.com No. IPCOM000214383D, Jan. 24, 2012, 5 pages (pp. 1-5 in pdf).

Gurumurthy, et al., "Method and System for Sharing Search Queries and Search Results," IP.com No. IPCOM000210142D, Aug. 26, 2011, 3 pages (pp. 1-3 in pdf).

Manning, et al., "An Introduction to Information Retrieval," Apr. 2009, pp. 349-375 (pp. 1-27 in pdf), Cambridge University Press, downloaded from: http://nlp.stanford.edu/IR-book/html/htmledition/flat-clustering-1.html on Sep. 3, 2013.

Manning, et al., "An Introduction to Information Retrieval," Apr. 2009, pp. 253-287 (pp. 1-35 in pdf), Cambridge University Press, downloaded from: http://nlp.stanford.edu/IR-book/html/htmledition/text-classification-and-naive-bayes-1.html on Sep. 3, 2013.

Castillo, et al., "Automatic Assignment of Domain Labels to WordNet", Proceedings of the $2^{nd}$ International WordNet Conference, Jan. 2004, pp. 75-82, Brno, Czech Republic.

Kamat, et al., "Understanding Users Intent by Deducing Domain Knowledge Hidden in Web Search Query Keywords", International Journal of Computer Applications, Apr. 2013, pp. 17-20, vol. 67, No. 15, IJCA Journal.

* cited by examiner

| 24A | BICYCLES | | |
|---|---|---|---|
| | RALEIGH | 9 | Brand |
| | RALEIGH | 4 | Place |
| | SCHWINN | 7 | Non-entity |
| | FRAME | 2 | Non-entity |

| 28A | DOCUMENT TITLE/ SUMMARY |
|---|---|
| | LINK TO DOCUMENT |
| | Subject 1, term 1, ecode 1; term 2, ecode 2; ... |
| | Subject 2, term 1, ecode 1; term 2, ecode 2; ... |

| 24B | AMERICAN HISTORY | | |
|---|---|---|---|
| | RALEIGH | 8 | Person |
| | RALEIGH | 6 | Place |
| | RALEIGH | 1 | Brand |
| | JEFFERSON | 9 | Non-entity |

| 28B | DOCUMENT TITLE/ SUMMARY |
|---|---|
| | LINK TO DOCUMENT |
| | Subject1 |
| | Subject2 |

Fig. 3

DOCUMENT TAGGING AND RETRIEVAL USING ENTITY SPECIFIERS

BACKGROUND OF THE INVENTION

1. Field of the Invention

The present invention is related to document retrieval and categorization, as well as information searches, and more specifically to a computer-performed method, computer system and computer program product for document tagging and retrieval using per-subject dictionaries that include entries that are distinguished as between entity and non-entity entries.

2. Description of Related Art

Information storage and retrieval in computer systems is an ever-evolving technology as collections of data become progressively larger and more complex. So-called "big data" involves collection of large amounts of data that may be essentially unfiltered and uncategorized. While businesses, government and other entities would like to capitalize on information that can be gleaned from such large collections of data, techniques to efficiently retrieve a manageable amount of information in response to a query are needed.

Retrieval of data from present-day databases and other more loosely-coupled information sources such as the Internet is typically performed by either crawler-based indexing, in which software engines obtain indexing information from stored documents, or from human-built directories that categorize the stored documents. However, once the data source becomes sufficiently large, the size of the response to a query also grows.

Therefore, it would be desirable to provide a method, computer system and computer program that can more efficiently handle categorization of documents and retrieval of documents in response to queries.

BRIEF SUMMARY OF THE INVENTION

The invention is embodied in a computer-performed method, computer program product and computer system that can efficiently categorize and retrieve documents. The method is a method of operation of the computer system, which executes the computer program product to carry out the steps of the method.

The method stores entries in multiple dictionaries that are each associated with a different subject. The entries contain descriptive terms, of which some entries are designated as entities by an indicator included in the entry. A dictionary may contain an entity and a non-entity entry for a descriptive term, and may include multiple entities for an entry, if they exist. Entities may be brands (trademarks/service marks), trade names, geographic identifiers or other classes of terms having special meaning. The entries may also include corresponding subject-determining-power scores that indicate the relative strength or weakness of the descriptive terms with respect to the subject associated with the containing dictionary.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 3 is a pictorial diagram showing organization of dictionaries as may be used in the document tagging and retrieval system of FIG. 2.

DETAILED DESCRIPTION OF THE INVENTION

Figure 1:
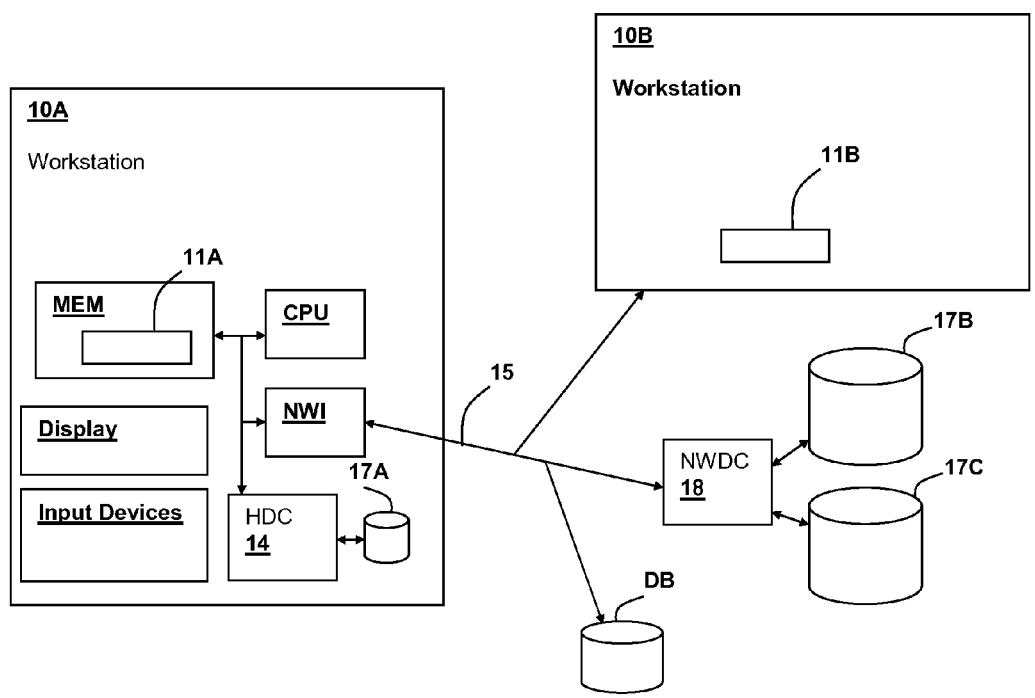
FIG. 1 is a block diagram illustrating a networked computer system in which techniques according to an embodiment of the present invention are practiced.

The present invention relates to document tagging and retrieval, and in particular to techniques for identifying and retrieving files in big data collections. Multiple dictionaries, each having a corresponding subject, contain terms that are associated with the subject, i.e., the terms that ordinarily occur in association with the subject in written documents. Thus, a term may occur across multiple dictionaries, but have a different meaning or descriptive power with respect to different subjects. Some of the terms or entries, are indicated as entities, thus the dictionary system distinguishes between entity and non-entity terms. A dictionary may include a non-entity and one or more entity entries for a single term, as a term may have multiple entity meanings. Entities may be brands (trademarks/service marks), trade names, geographic identifiers or other classes of terms having special meaning. The term entries in each dictionary have a code or other indicator that specifies whether or not the term is an entity, and an entity type for terms that are entities.

The term entries in each dictionary may also have a score value associated with the term and stored in the dictionary along with the term. The score value is a "subject-determining-power score" (SDP score) that is an indicator of the power of the term to determine the subject of a query, a document, or other item associated with the term. For example, an SDP score may be used to weight terms used to tag a document, according to how strongly they indicate that the document concerns a particular subject. A tag is stored information that is descriptive in some manner of an associated document. The tag can be stored in the document itself, e.g., as metadata in a header, or the tag may be stored separately from the document, e.g., in a database containing a link to the document. The process of tagging is generating or selecting the tag information and storing it in a manner that associates the tag(s) with the document. Tagging can occur when a document is first added to a collection, which may be storage of the document in a particular storage location, or may be insertion of a link to the document in a database, or tagging may occur subsequently. Tags can be altered as new information about a document is available, as subjects/categories are added to the dictionaries, or as the dictionaries are updated with new terms and/or new SDP scores.

Documents are retrieved by identifying documents from a collection and returning the documents to a requesting entity. The particular documents returned and the particular order of the documents can be determined by the quality of a match of the documents to one or more subjects determined from the contents of a query. The response to a query can differ. One possible response includes copying the documents to a pre-determined location, such as a directory that has been specified or created to receive the results of the query. Another possible response is generation of a file that contains a list of document identifiers, e.g., file pathnames or links, in order of priority, and optionally including a match-score associated with each document. A third option is generation of an html document, e.g., html browser page that provides links to the documents in the order of priority, e.g. ordered by quality of the match of the individual documents to the query.

As mentioned above, dictionaries, as referred to herein, are subject-specific lists of terms along with indications of entity type (including non-entity) and differentiating SDP scores for the terms. A term can be a single word or multiple words, and can potentially include letters, numbers, punctuation, etc. The same term may appear in the dictionaries for different subjects and as both entity and non-entity entries with different SDP scores for each entry. In essence, an SDP score for a particular term for a particular subject indicates how strongly the appearance of the term suggests the term concerns the particular subject. Terms can be single words or multi-words, e.g., War of 1812. When processing queries or documents to discover terms, standard text pre-processing can be performed before any of the analytical steps, such as phrase detection using punctuation or detection of separators such as the, and, more, etc., which can be removed from the text. Similarly, stemming can be performed to reduce or expand words of a single root to a single term, e.g., the word "acted" may be stemmed to the word "act." Natural language processing (NLP) techniques can be used to distinguish partial terms in a query and to determine when a term is used as an entity or non-entity, allowing the identification of terms that are used as entities, which are then marked in order to use the term-entity combinations as unique terms. In processing queries, entities may be further identified by a user classification, such as selecting an entity type from a pull-down menu when hovering over the term in a query input text entry box.

Dictionaries can also be used for the task of entity-labeling. Dictionary-assisted entity-labeling differs from dictionary-assisted document tagging and document retrieval in that the document text may be modified or enhanced. In dictionary-assisted entity-labeling, entity labeling can be performed dynamically as a document is matched to a dictionary. For example, a new document may have an overall strong match to a collection of terms in a bicycle dictionary. If the bicycle dictionary contains RALEIGH labeled as a brand entity, for example due to parsing earlier documents that yielded a strong indication that RALEIGH is sometimes used as a brand identifier, RALEIGH can be labeled as a brand entity in the new document, with an optional confidence score. Alternatively, a "Bicycle brands" or a "Brands" dictionary containing RALEIGH may be used to identify the use of brand entity RALEIGH in a collection of documents.

Another option for document retrieval uses an entity label to aid in searching when a search term is not found in the dictionaries. Specifically, if document tags contain terms in addition to dictionary match information, the document retrieval process can return documents with the relevant entity in their tags. If the tags contain only dictionary-match information, not terms, documents that have terms that match entity terms in dictionaries can be returned. An example is a search for "9182<tax doc #>." If "9182" does not occur in any dictionary, documents that match to a dictionary that contains entity "tax doc #" can be returned. For example search "9182<tax doc #>" may return a document that matches well to an "IRS" dictionary which contain entries such as: "1040<tax doc #>" and "W2<tax doc #>." The set of entity types is generally finite, but can be customized, e.g., for an enterprise. Entity types may be selected, for example, from a pull-down menu, which may be for individual search terms, or for an entire query or session.

Referring to FIG. 1, a networked computer system in which an embodiment of the present invention is practiced is depicted in a block diagram. A first workstation computer system 10A includes a processor CPU coupled to a memory MEM that contains program instructions for execution by processor CPU, including a document collection interface 11A, which may be a dedicated engine for performing tasks in a collection of documents as described herein, or which may be a generic browser interacting with a dedicated engine located in another system, such as document collection interface 11B of workstation 10B. The tasks performed by one or both of document collection interfaces 11A and 11B include query processing, document tagging, directory creation and other tasks associated with managing the collection of documents and dictionaries used by and operated on by the embodiments of the invention disclosed herein. Workstation computer 10A is also depicted as including a graphical display Display and input devices Input Devices, such as mice and keyboards, for interacting with user interfaces including login screens and other user interfaces for interacting with other computers connected to the network, for example, administration screens for administering identification and authorization profiles used by the techniques of the present invention.

Workstation computer system 10A also includes a hard disc controller HDC 14 that interfaces processor CPU to local storage device 17A and a network interface NWI that couples workstation computer system 10A to network 15, which may be fully wireless, fully wired or any type of hybrid network. Network interface NWI provides access to network resources, such as remote storage provided by networked storage devices 17B and 17C, which are coupled to network 15 by network disc controller (NWDC) 18. An external database DB may provide storage for documents, dictionaries, query results and other information discussed herein, alternatively document collection interfaces 11A and 11B may perform database organization, with the above-listed items stored as files in local storage device 17A or networked storage devices 17B and 17C. Workstation computer system 10B has an internal organization similar to that depicted in workstation computer system 10A and is also coupled to network 15.

Network 15 may include wireless local area networks (WLANs), wired local-area networks (LANs), wide-area networks (WANs) or any other suitable interconnection that provides communication between workstation computer systems 10A and 10B, storage devices 17A-17C, external database DB and any other systems and devices coupled to network 15. The present invention concerns document storage and retrieval functionality that is not limited to a specific computer system or network configuration. Finally, the specification workstation computer systems 10A and 10B and the location of their specific memory MEM and document collection interfaces 11A and 11B does not imply a specific client-server relationship or hierarchical organization, as the techniques of the present invention may be employed in distributed systems in which no particular machine is identified as a server. However, at least one of the machines provides an instance and functionality of an object or interface that performs document storage and retrieval in accordance with an embodiment of the present invention. The objects or interfaces implementing document collection interfaces 11A and 11B process information according to methods and structures of the present invention, as described in further detail below.

Figure 2:
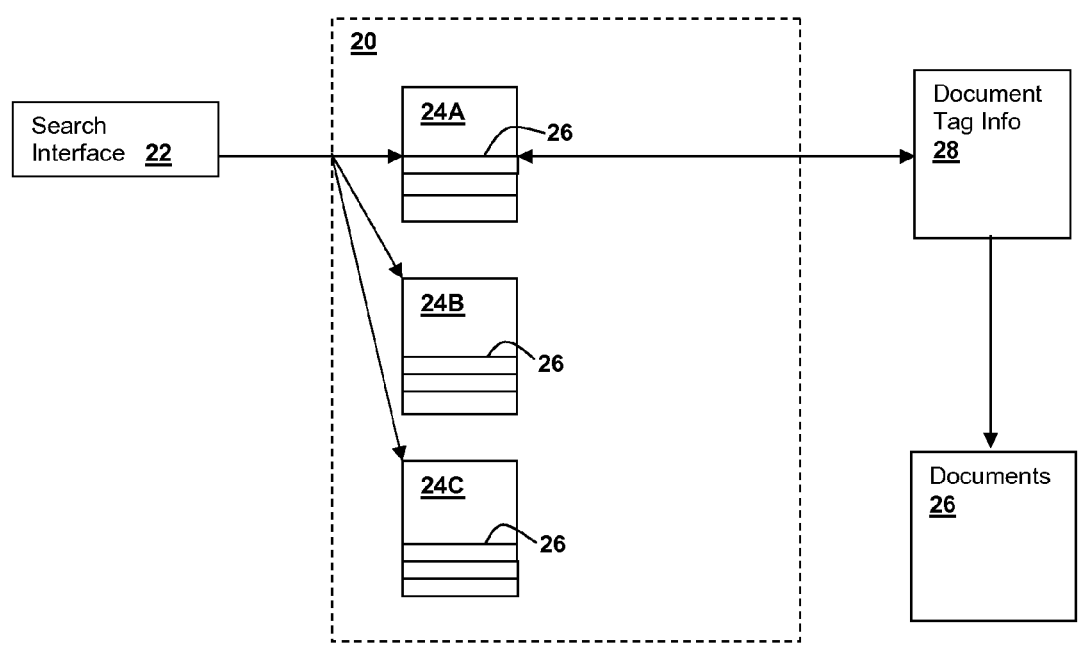
FIG. 2 is an organizational diagram showing an organization of a document tagging and retrieval system in accordance with an embodiment of the present invention.

Referring now to FIG. 2, an organization of a document tagging and retrieval system in accordance with an embodiment of the present invention is illustrated. A search interface 22, which may be a dedicated search interface, or a browser-based search portal as described above, provides access to a dictionary manager 20 that processes the terms in the queries supplied by search interface 22 in order to determine the subject of the query and other targeted information that will be used to retrieve one or more of documents 26. Per-subject dictionaries 24A-24C contain lists of terms their corresponding entity types (including non-entity) and corresponding SDP scores for the containing dictionary. Document tag information 28, which may be stored in documents 26, but is generally stored in a separate database or file for faster parsing of document tag information 28, is also accessed by dictionary manager 20 to discover documents having the closest match to the subject and particular search terms provided in a query from search interface 22. Dictionaries including SDPs can be created in different ways including: human-generated lists of terms with human-estimated SDPs, human-generated lists of terms with automatically calculated SDPs.

Referring now to FIG. 3, organization of dictionaries as may be used in the document tagging and retrieval system of FIG. 2, is shown. A first example dictionary 24A has a corresponding subject of Bicycles, and contains the term RALEIGH twice, once as a brand entity and once as a place entity. The terms SCHWINN and FRAME are present, but are not labeled as entities, illustrating that entity marking is not required for brands such as SCHWINN that have no other strong meaning. The terms have associated SDP scores given in an exemplary range of 1 through 10, of 9, 4, 7 and 2, respectively. Discovery of a brand entity RALEIGH in the query indicates a high probability that the subject of the search corresponds to bicycles, but the discovery of the term RALEIGH as a place entity in the query indicates only a low probability that the subject of the search corresponds to bicycles. Another example dictionary 24B, having a corresponding subject of American History, contains the term RALEIGH three times, once as a person entity, once as a place entity and once as a brand entity, with associated SDP scores of 8, 6 and 1, respectively. The pair of dictionaries 24A and 24B illustrates that a term, e.g., RALEIGH may be present in multiple dictionaries, have different entity types (including non-entity) and have different SDP scores in each of the different per-subject dictionaries.

Also illustrated in FIG. 3, are exemplary document tags that may be used to implement document tag information 28 as illustrated in FIG. 2. In exemplary document tag 28A, the tag information, which is just a single document tag that may be included in a header of a document, stored in a tag database, or otherwise organized in a tag store file, contains an optional document title and summary, a link to the actual document, and lists of terms and entity codes by subject for each of multiple subjects that the document concerns. The title and summary information are optional, but may be included to provide a quick resource for displaying search results. The link to the document is not needed if the tag information is itself stored in the document header. Exemplary document tag 28B includes subject names, as dictionary manager 20 can use lists of subjects without specified lists of terms to perform matching within the set of dictionaries.

Figure 4:
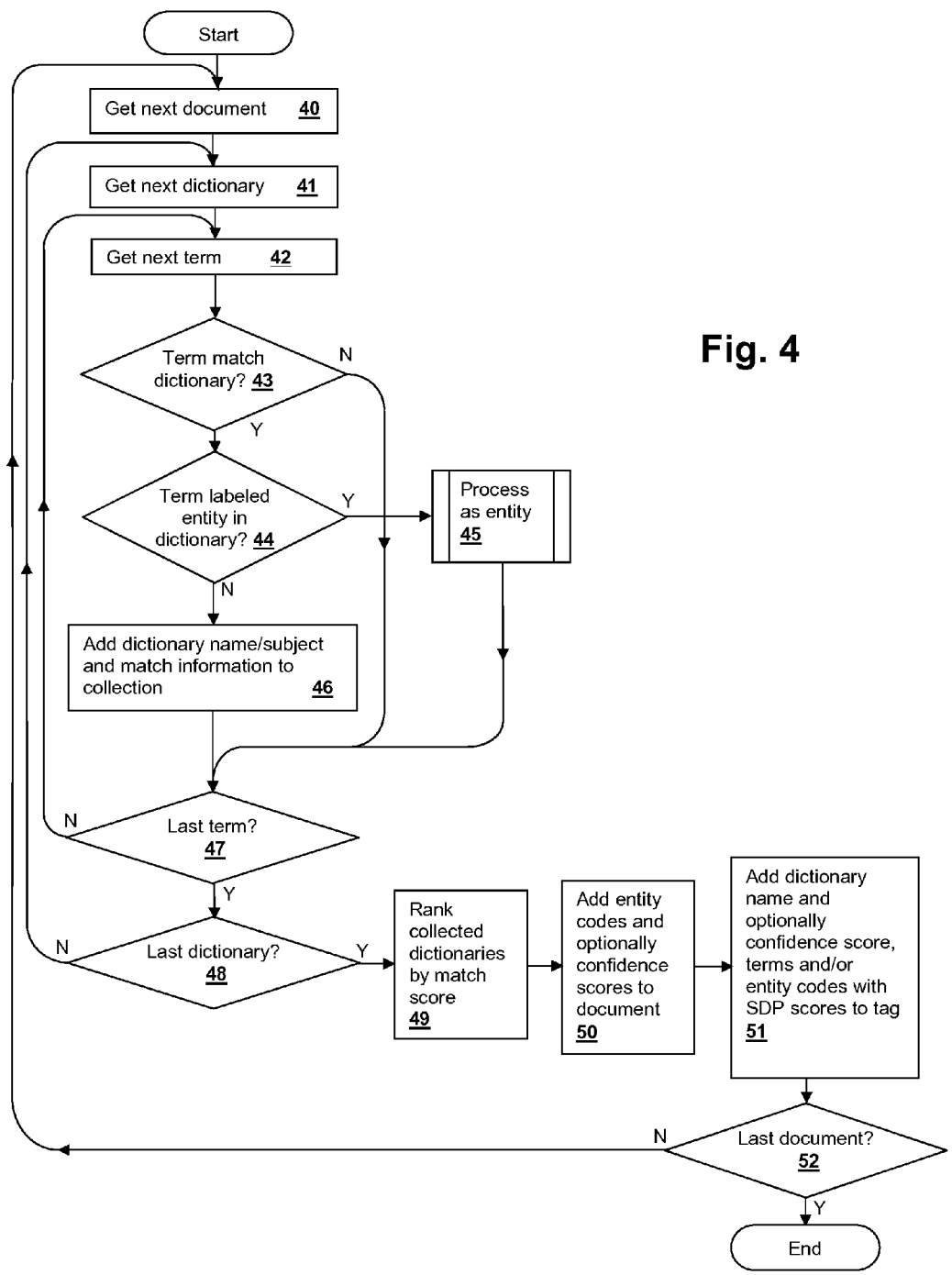
FIG. 4 is a flowchart illustrating a document tagging methodology in accordance with an embodiment of the present invention.

Referring now to FIG. 4, a method of tagging documents in accordance with an embodiment of the invention is shown in a flowchart. The next document is retrieved (step 40), the next dictionary is accessed (step 41) and the next term is retrieved (step 42). If a term matches a term in one of the dictionaries (decision 43), and the term is labeled as an entity in the dictionary (decision 44), then the term is processed as an entity (step 45), according to the method shown in FIG. 5 as described below. If the term does not match the dictionary (decision 43), and the term is the last term (decision 47) and the dictionary is the last dictionary (decision 48), then the process of tagging documents proceeds to steps 49-52. If the term is not labeled as an entity (decision 44), then the dictionary name or subject (or other suitable identifier for the dictionary) and the term match information is added to the collection (step 46). The term match information can include the SDP score for the matching term, any entity codes, etc. Until the last term is processed (decision 47), the next term is retrieved (step 42). Until the last dictionary is processed (decision 48) the next dictionary is accessed (step 41). After the last dictionary is processed, the collected dictionaries are ranked by match score (step 49), and entity codes and optionally confidence scores are added to the document (step 50). The dictionary name and optionally confidence score and/or terms with SDP scores and entity type labels are added to the document tag (step 51). Until the last document is processed (decision 52), the next document is retrieved and tagged according to the process of steps 40-51. In the example, the first step in tagging a document is matching the document against the set of dictionaries. The document can then be tagged with information such as: the names of the n top-matching dictionaries, a match score of the document against all dictionaries, or the top m words from the n top-matching dictionaries. A dictionary match annotation in the tag may include a confidence score. If dictionary words are included in the tags, they can include the SDP of the word in the dictionary, along with the entity type. The choice of information with which to tag depends on storage space and ease of use for retrieval of the document. Dictionary-matching may be performed by finding all common terms as between the document and a dictionary of interest, generating a document-occurrence vector with one entry per common term, generating a dictionary-vector with one entry per common term in the same order as the vector above, and multiplying the two vectors to get a dictionary-match score between the document and the dictionary. The vector multiplication sums the term-by-term products of the two vectors to produce a single number. The values of the dictionary-vector are the SDP scores. For a given document, the process can be repeated for all dictionaries. Once the dictionary-match step is completed, tags can be chosen for the document as described above.

One manner in which the tagging information associated with a single document may be organized is to include the search terms in the tagging information along with the subject and SDP scores, such as illustrated in Table 1 below:

TABLE 1

| Confidence value | Subject of Dictionary | Term/SDP score pairs |
|---|---|---|
| 0.5 | Bicycle | Bottom-Bracket 8, Schwinn 10, Raleigh (brand) 10, Frame 3 ... |
| 0.3 | Home Construction | Brick 5, Frame 3, ... |
| 0.1 | Fishing | Hook 7, Line 2 |

In the Example given above, once a candidate subject has selected, the terms having the top SDP scores (e.g., top 100 terms) may be inserted into the document tagging information in order to generalize the intersection between potential query terms and the document tag information. So, for example, in the above illustration, if the search terms Schwinn and Frame are included in a query, then the values for Schwinn and Frame for the subject Bicycle can be weighted by the confidence value to yield a measure of match for the document, i.e., 0.5×(10+3)=6.5. For example, if three documents having the following entries are matched to the above-query, as illustrated in Table 2 below, then the following match calculations can result.

TABLE 2

| Document | Confidence value | Subject of Dictionary | Term/SDP score pairs |
|---|---|---|---|
| Doc 1 | 0.5 | Bicycle | Bottom-Bracket 8, Schwinn 10, Raleigh 10, Frame 3 ... |
| Doc 2 | 0.9 | Yoga | Hatha 10 |
| Doc 3 | 0.7 | Home Construction | Brick 5, Frame 3, ... |

Doc 1: 0.5 × (10 + 3) = 6.5
Doc 2: 0
Doc 3 0.7 * 3 = 2.1

So the search result should return the ordered list <doc 1, doc 3>.

In another form of tag information, a match step has previously been carried out between the documents that are candidates for retrieval and the dictionaries as described above, and the match scores are stored in the tags. Example strategies for carrying out retrieval using such documents are described below.

Strategy 1: $1^{st}$ place search-text match

First, a vector multiplication as described above is performed and a top-matching dictionary t is identified using the text of the query, which in this strategy is used instead of the text of the document. The method then returns all candidate documents having a top-matching dictionary t and then proceeds to documents having a next-to-top matching dictionary t, and so forth until the documents have been exhausted or a threshold number of documents has been found. The documents can optionally be returned in order of a strength of match between the document and t.

Strategy 2: nth place search-text match

First, the vector multiplication as described above is performed and a top-matching dictionary t1, second top-matching dictionary t2, third top-matching dictionary t3, and so forth, are identified using the text of the query. The method then returns all candidate documents having a top-matching dictionary t1 and then proceeds to documents having a top matching dictionary t2, and so forth until the documents have been exhausted or a threshold number of documents has been found. The documents can optionally be returned in order of a strength of match between the document and the various dictionaries.

The dictionary-assisted retrieval techniques described above provides search expansion. Search text is matched to dictionaries, which will generally contain more terms than the search text itself. Since retrieval is done using dictionaries, terms in the dictionaries outside the search text can play a role in identifying relevant documents. For example, "fetlock" is a high subject-determining-power word for the subject "horses". If a search text contains words like "saddle," "ride," and "horse," it may match well to the horse dictionary, which in turn will match to candidate documents that have the word "fetlock" in them. Such candidate documents may not have any of the words "saddle", "ride" or "horse" in them, but could have been identified as being on the subject "horses" by virtue of their using the high-SDP term "fetlock." The query text can be a list of words, as would be used in a typical Internet search engine query, or the query itself can be a document, (e.g., a patent abstract). Note that a document query input may have repeated terms. When repeated terms are present in a query, one option is to use only the unique terms as the query text. Another option is to use the query text as-is, which will cause actions based on term-occurrence to be repeated for repeated terms, which increases the weight accorded to repeated terms.

Figure 5:
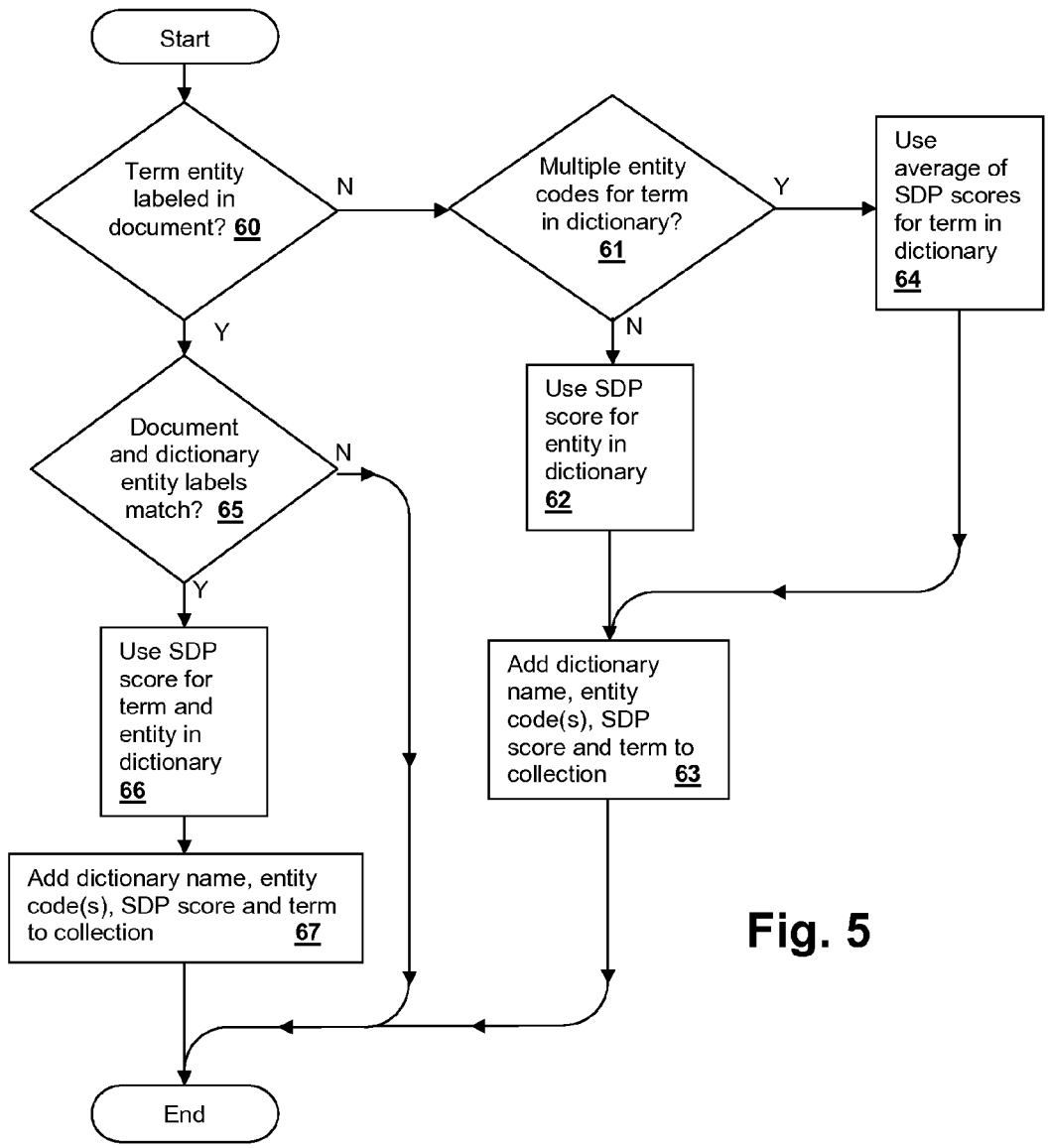
FIG. 5 is a flowchart illustrating a method of entity processing that may be used to implement step 45 of FIG. 4.

Referring now to FIG. 5, a method of performing the processing step 45 of FIG. 4 is shown in accordance with an embodiment of the invention in a flowchart. If the term is not entity-labeled in a document (decision 60), and multiple entity codes for the term are not present in the dictionary (decision 61), then the SDP score for the entity in the dictionary is used (step 62) and the dictionary name, entity code(s), SDP and term is added to the collection of tagging information for the current document (step 63). If multiple entity codes for the term are present in the dictionary (decision 61), then the average of SDP scores present in the dictionary for the term is used (step 64) and added to the collection of tagging information (step 63). If a term is entity-labeled in a document (decision 60) and the document and dictionary entity labels match (decision 65) then the SDP score is used for the term and entity in the dictionary (step 66), and the dictionary name, entity code(s), SDP and term are added to the collection of tagging information for the current document (step 67).

Figure 6:
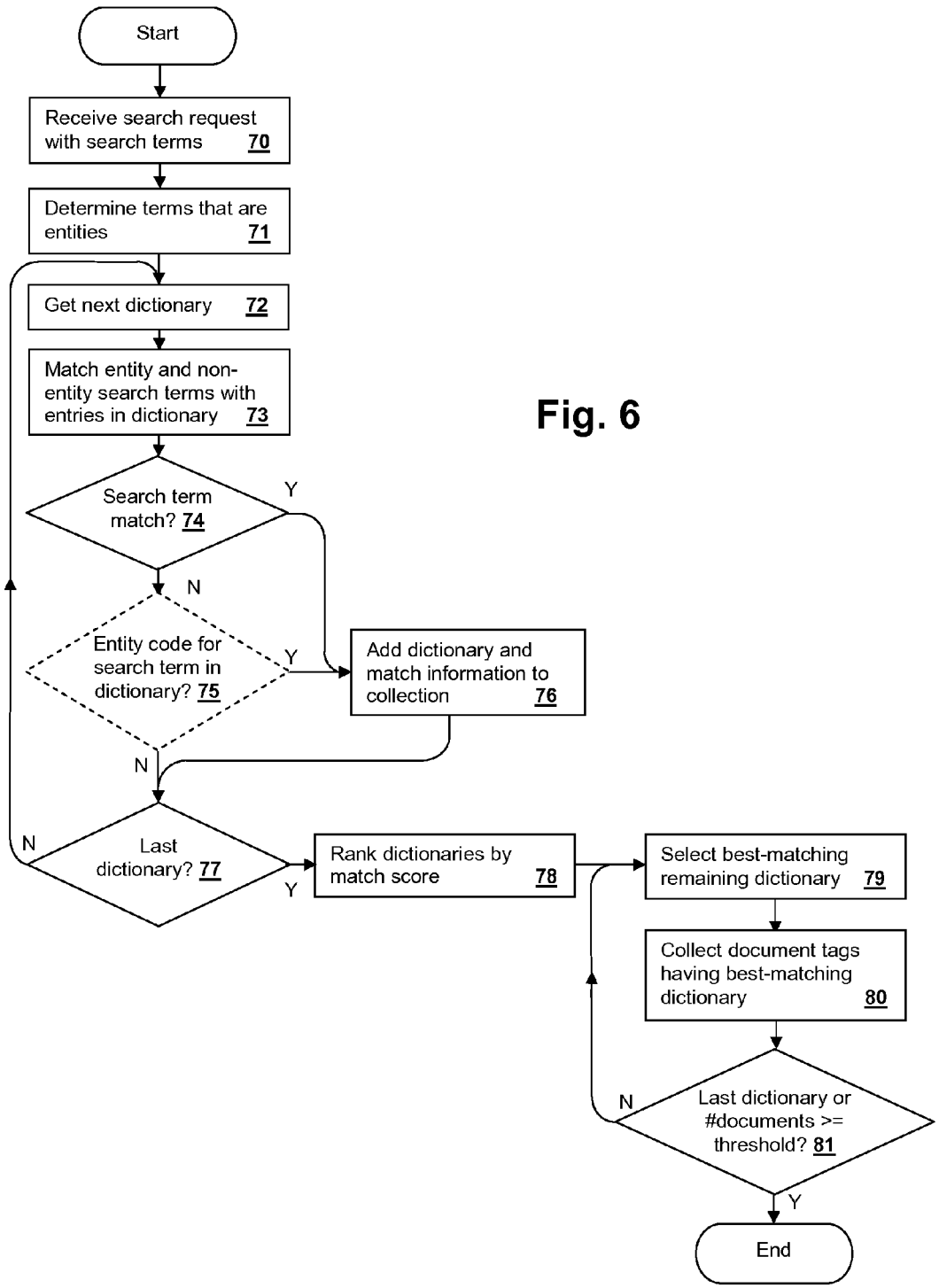
FIG. 6 is a flowchart illustrating a document retrieval methodology in accordance with an embodiment of the present invention.

Referring now to FIG. 6, a method of document retrieval in accordance with an embodiment of the invention is shown in a flowchart. A search request is received with search terms consisting of one or more words (step 70), search terms are then determined as entities (step 71), and the next dictionary is accessed (step 72). Terms, i.e., words or phrases in the search query, are matched with entries in the dictionary (step 73). If the search term matches entries in the dictionary (decision 74), then the dictionary is added to the collection (step 76). Optionally, if the entity code for the search term is in the dictionary (decision 75), then the dictionary is also added to the collection (step 76). Until the last dictionary is reached (decision 77), steps 70-76 are repeated. After the last dictionary is reached (decision 77), the dictionaries are ranked by their match scores (step 78). As described above, the documents can be collected according to their ranked match to a single subject, or a top-ranked number of subjects can be determined from the search term and documents matching those top-ranked subjects can be retrieved. Document tags are collected according to those having the best-matching dictionary (step 80). Until the number of documents is greater than a threshold number (decision 81), the next best-matching dictionary is found (step 79), and steps 79-81 are repeated. The manner in which retrieval is performed depends on the type of document tags that are provided. If tags include dictionary terms in them, the retrieval process can commence with searching directly for the search text among the tags in addition to the subject matches and returning documents having tags that match the query text. If the tags include only dictionary subject matching information, the search text is matched against the dictionaries and the documents tagged with subject matching dictionaries can be returned.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer-readable medium(s) may store a program in accordance with an embodiment of the invention. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer-readable storage medium may be any tangible medium that can contain, or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method of organizing a collection of electronic documents, the method comprising:
in a computer system, storing entries in multiple dictionaries separate from and not associated with any particular one of the electronic documents, wherein the multiple dictionaries are data structures stored within the computer system, wherein individual ones of the multiple dictionaries correspond to one of a plurality of different subjects, wherein the entries contain a descriptive term and wherein entries corresponding to an entity contain an entity type code indicating that the entry is an entity entry with respect to a subject of the one of the multiple dictionaries in which the entry is stored and a category of that entity, wherein entity entries are identified as belonging to one or more special categories of terms that have special meaning with respect to their corresponding subjects, and wherein at least some of the descriptive terms are present in two or more of the multiple dictionaries;

responsive to requests within the computer system, accessing the collection of electronic documents by matching terms contained in the electronic documents with descriptive terms in the multiple dictionaries to determine one or more subjects of the electronic documents from subjects of one or more of the multiple dictionaries that contain the descriptive terms matching the terms contained in the electronic documents; and responsive to the matching detecting a match between a descriptive term in one of the multiple dictionaries, determining whether or not the entry containing the descriptive term has an entity type code;

responsive to determining that the entry has an entity type code, providing an indication of the entity type code in conjunction with an indication of the one or more subjects of the electronic documents along with the one or more subjects determined by the determining in response to the requests;

storing a representation of the one or more subjects determined by the determining one or more subjects of the electronic documents along with the indication of the entity type code in a memory of the computer system as tags associated with the collection of electronic documents wherein the tags describe subjects to which the corresponding electronic documents pertain;

receiving a request to identify one or more of the electronic documents, wherein the request includes at least one search term descriptive of the one or more electronic documents and at least one entity type code identifying the search term as an entity and a type of the entity;

determining whether the at least one search term is present in a given one of the multiple dictionaries;

responsive to determining that the at least one search term is present in the given dictionary, first detecting whether an entry matching the at least one search term is an entity or a non-entity;

responsive to determining that the at least one search term is not present in the given dictionary, second detecting whether or not an entry matching the at least one entity type code is present in the given dictionary;

using a result of the first detecting and a result of the second detecting in determining at least one subject for the at least one search term; and matching the at least one subject with the tags associated with the collection of electronic documents to obtain the one or more electronic documents to return in response to the request; and storing a representation of the one or more electronic documents in a memory of the computer system to provide the response to the request to identify the one or more electronic documents.

2. The method of claim 1, wherein the special meanings include brands and geographic identifiers.

3. The method of claim 1, wherein the multiple dictionaries include multiple entries for the same descriptive term, wherein the multiple entries include at least one non-entity entry and at least one entity entry.

4. The method of claim 1, wherein the multiple dictionaries include multiple entity entries for the same descriptive term.

5. The method of claim 1, wherein the entries further contain subject-determining-power scores corresponding to each term, wherein an individual subject-determining-power score indicates the relative strength or weakness of the corresponding descriptive term with respect to the subject of the one of the multiple dictionaries containing the entry in which the descriptive term is stored, and wherein the accessing further comprises selecting a corresponding subject-determining-power score for the term in conformity with a result of the determining whether or not the entry has an indication that the entry is an entity entry.

6. The method of claim 1, further comprising creating the multiple dictionaries, the creating comprising:
- collecting the descriptive terms for each dictionary;
- determining whether a descriptive term is an entity or a non-entity; and
- storing the descriptive terms as entries in the dictionaries along with the indications whether or not the entries are entity entries or non-entity entries.

7. A computer system comprising:
- a processor for executing program instructions;
- a memory coupled to the processor for storing the program instructions, wherein the program instructions are program instructions for organizing a collection of electronic documents, and wherein the program instructions comprise program instructions for storing entries in multiple dictionaries separate from the electronic documents, wherein the multiple dictionaries are data structures stored within the computer system, wherein individual ones of the multiple dictionaries correspond to one of a plurality of different subjects, wherein the entries contain a descriptive term and wherein entries corresponding to an entity contain an entity type code indicating that the entry is an entity entry with respect to a subject of the one of the multiple dictionaries in which the entry is stored and a category of that entity entry with respect to a subject of the one of the multiple dictionaries in which the entry is stored and a category of that entity, wherein entity entries are identified as belonging to one or more special categories of terms that have special meaning with respect to their corresponding subjects, and wherein at least some of the descriptive terms are present in two or more of the multiple dictionaries, program instructions for accessing the collection of electronic documents by matching terms contained in the electronic documents with descriptive terms in the multiple dictionaries to determine one or more subjects of the documents from subjects of one or more of the multiple dictionaries that contain the descriptive terms matching the terms contained in the electronic documents, program instructions for, responsive to the matching detecting a match between a descriptive term in one of the multiple dictionaries, determining whether or not the entry containing the descriptive term has an entity type code, and program instructions for, responsive to determining that the entry has an entity type code, providing an indication of the entity type code in conjunction with an indication of the one or more subjects of the electronic documents along with the one or more subjects determined by the determining in response to the request, storing a representation of the one or more subjects determined by the determining one or more subjects of the electronic documents along with the indication of the entity type code in a memory of the computer system as tags associated with the collection of electronic documents where the tags describe subjects to which the corresponding electronic documents pertain, receiving a request to identify one or more of the electronic documents, wherein the request includes at least one search term descriptive of the one or more electronic documents and at least one entity type code identifying the search term as an entity and a type of entity, determining whether the at least one search term is present in a given one of the multiple dictionaries, responsive to the determining that the at least one search term is present in the given dictionary, first detecting whether an entry matching the at least one search term is an entity or a non-entity, responsive to determining that the at least one search term is not present in the given dictionary, second detecting whether or not the entry matching the at least one entity type code is present in the given dictionary, using a result of the first detecting and the second detecting in determining at least one subject for the at least one search term, matching the at least one subject with tags associated with the collection of electronic documents to obtain the one or more electronic documents to return in response to the request, and storing a representation of the one or more electronic documents in a memory of the computer system to provide the response to the request to identify the one or more electronic documents.

8. The computer system of claim 7, wherein the program instructions for special meanings include brands and geographic identifiers.

9. The computer system of claim 7, wherein the program instructions for multiple dictionaries include multiple entries for the same descriptive term, wherein the multiple entries include at least one non-entity entry and at least one entity entry.

10. The computer system of claim 7, wherein the program instructions for multiple dictionaries include multiple entity entries for the same descriptive term.

11. The computer system of claim 7, wherein the program instructions for entries further contain subject-determining-power scores corresponding to each term, wherein an individual subject-determining-power score indicates the relative strength or weakness of the corresponding descriptive term with respect to the subject of the one of the multiple dictionaries containing the entry in which the descriptive term is stored, and wherein the accessing further comprises selecting a corresponding subject-determining-power score for the term in conformity whether or not the entry has an entity type code.

12. The computer system of claim 7, further comprising program instructions for creating the multiple dictionaries, the creating comprising:
- program instructions for collecting the descriptive terms for each dictionary;
- program instructions for determining whether a descriptive term is an entity or a non-entity; and
- program instructions for storing the descriptive terms as entries in the dictionaries along with the indications whether or not the entries are entity entries or non-entity entries.

13. A computer program product comprising a computer-readable storage device storing program instructions for organizing a collection of electronic documents, wherein the program instructions comprise program instructions for:
- in a computer system, storing entries in multiple dictionaries separate from and not associated with any particular one of the electronic documents, wherein the multiple dictionaries are data structures stored within the computer system, wherein individual ones of the multiple dictionaries correspond to one of a plurality of different subjects, wherein the entries contain a descriptive term and wherein entries corresponding to an entity contain an entity type code indicating that the entry is an entity entry with respect to a subject of the one of the multiple dictionaries in which the entry is stored and a category of that entity, wherein entity entries are identified as belonging to one or more special categories of terms that have special meaning with respect to their corresponding subjects, and wherein at least some of the descriptive terms are present in two or more of the multiple dictionaries;

responsive to requests within the computer system, accessing the collection of electronic documents by matching terms contained in the electronic documents with descriptive terms in the multiple dictionaries to determine one or more subjects of the documents from subjects of one or more of the multiple dictionaries that contain the descriptive terms matching the terms contained in the electronic documents;

responsive to the matching detecting a match between a descriptive term in one of the multiple dictionaries, determining whether or not the entry containing the descriptive term has an entity type code;

responsive to determining that the entry has an entity type code, providing an indication of the entity type code in conjunction with an indication of the one or more subjects of the electronic documents along with the one or more subjects determined by the determining in response to the requests;

storing a representation of the one or more subjects determined by the determining one or more subjects of the electronic documents along with the indication of the entity type code in a memory of the computer system as tags associated with the collection of electronic documents wherein the tags describe subjects to which the corresponding electronic documents pertain;

receiving a request to identify one or more of the electronic documents, wherein the request includes at least one search term descriptive of the one or more electronic documents and at least one entity type code identifying the search term as an entity and a type of the entity;

determining whether the at least one search term is present in a given one of the multiple dictionaries;

responsive to determining that the at least one search term is present in the given dictionary, first detecting whether an entry matching the at least one search term is an entity or a non-entity;

responsive to determining that the at least one search term is not present in the given dictionary, second detecting whether or not an entry matching the at least one entity type code is present in the given dictionary;

using a result of the first detecting and a result of the second detecting in determining at least one subject for the at least one search term;

matching the at least one subject with tags associated with the collection of electronic documents to obtain the one or more electronic documents to return in response to the request; and storing a representation of the one or more electronic documents in a memory of the computer system to provide the response to the request to identify the one or more electronic documents.

14. The computer program product of claim 13, wherein the program instructions for special meanings include brands and geographic identifiers.

15. The computer program product of claim 13, wherein the program instructions for multiple dictionaries include multiple entries for the same descriptive term, wherein the multiple entries include at least one non-entity entry and at least one entity entry.

16. The computer program product of claim 13, wherein the program instructions for multiple dictionaries include multiple entity entries for the same descriptive term.

17. The computer program product of claim 13, wherein the program instructions for entries further contain subject-determining-power scores corresponding to each term, wherein an individual subject-determining-power score indicates the relative strength or weakness of the corresponding descriptive term with respect to the subject of the one of the multiple dictionaries containing the entry in which the descriptive term is stored, and wherein the accessing further comprises selecting a corresponding subject-determining-power score for the term in conformity with a result of the determining whether or not the entry has an indication that the entry is an entity entry.

18. The computer program product of claim 13, further comprising program instructions for creating the multiple dictionaries, the creating comprising:

collecting the descriptive terms for each dictionary;

determining whether a descriptive term is an entity or a non-entity; and storing the descriptive terms as entries in the dictionaries along with the indications whether or not the entries are entity entries or non-entity entries.

\* \* \* \* \*